United States Patent [19]
Carney

[11] 3,917,662
[45] Nov. 4, 1975

[54] PREPARATION OF FATTY ACID ESTERS
[75] Inventor: Robert L. Carney, Palo Alto, Calif.
[73] Assignee: Zoecon Corporation, Palo Alto, Calif.
[22] Filed: June 17, 1974
[21] Appl. No.: 479,977

Related U.S. Application Data
[63] Continuation-in-part of Ser. No. 465,045, April 29, 1974, abandoned.

[52] U.S. Cl.................... 260/410.9 R; 260/488 F
[51] Int. Cl.$^2$........................................... C11C 3/02
[58] Field of Search.................. 260/410.9 R, 488 F

[56] References Cited
UNITED STATES PATENTS
2,822,348  2/1958  Haslam ...................... 260/410.9 R
3,056,817  10/1962  Werber ...................... 260/410.9 R
3,056,818  10/1962  Werber ...................... 260/410.9 R
3,332,983  7/1967  Barie ...................... 260/410.9 R
3,418,359  12/1968  Barie ...................... 260/410.9 R Primary Examiner—Helen M. McCarthy
Assistant Examiner—John F. Niebling
Attorney, Agent, or Firm—Donald W. Erickson

[57] ABSTRACT

Esters of fatty acids are prepared in high yield by reacting a tetraalkyl titanate with a fatty acid or an ammonium salt thereof.

10 Claims, No Drawings

PREPARATION OF FATTY ACID ESTERS

This invention relates to a novel process for preparing fatty acid esters in high yield. More particularly, this invention relates to the preparation of fatty acid esters by the reaction of a tetraalkyl titanate with a fatty acid or an ammonium salt thereof.

The process of this invention provides a convenient and economical, one-step process for preparing fatty acid esters in high yield. In carrying out the reaction, a fatty acid of the formula

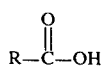

or an ammonium salt thereof is reacted with a tetraalkyl titanate of the formula $(R'O)_4Ti$, wherein R is an aliphatic hydrocarbon group having a carbon atom chainlength of at least 6 carbon atoms and optionally substituted by one or more alkoxy groups, and R' is lower alkyl. This reaction is particularly advantageous for preparing esters of conjugated unsaturated esters which are often difficult to obtain by alternate routes.

In order to obtain maximum yields, the molar ratio of fatty acid to titanate must not be less than 1.0:0.9. While no limit need be set on the excess of titanate that can be present, as a practical matter, no advantage is derived from greater than a four-fold molar excess of titanate to acid. Preferably 0.9 to 2 molar equivalents of titanate per mole of acid is employed. In order to maximize the economic advantages of the reaction, 0.9 to 1.5 molar equivalents of titanate per mole of acid is preferred. Ordinarily, only 0.75 molar equivalents of tetraalkyl titanate are consumed in the reaction. Excess titanate may be recovered at the end of the reaction by distillation.

While the acid may be diluted with a small amount of an easily distillable solvent inert to the reaction, such as hexane, it is preferred that the reaction be carried out in the absence of any solvent.

The reaction is carried out at a temperature of from about 110° to 200°C, preferably 130° to 185°C, and at a pressure greater than 200 mm Hg. While pressures greater than atmospheric are not detrimental, it is preferred to conduct the reaction at atmospheric pressure to minimize the need for additional equipment.

The reaction is ordinarily complete in about 1 to 2 hours. It will, of course, be appreciated that if the fatty acid portion of the molecule is subject to thermal decomposition, rearrangement, or other undesirable side-reactions, the reaction mixture should be held at high temperature (i.e. greater than 50°C) no longer than necessary, and definitely not longer than 8 hours after the reaction is initiated.

During the initial phase of the reaction, by-product alcohol from the tetraalkyl titanate (along with any solvent initially present) is removed by distillation. If the ammonium salt of the acid is being employed, ammonia is also evolved and removed at this stage.

After completion of the reaction, residual tetraalkyl titanate ester may be recovered from the reaction mixture by distillation under vacuum at a temperature higher than 90° or residual organotitanate compounds can be removed from the product ester by diluting with a solvent inert to the ester, such as hexane, pentane, benzene, xylene, and the like, and adding a small amount of water and a base such as calcium oxide or sodium hydroxide. The resultant precipitate of hydrated titanium oxide is removed by filtration. Alternatively, the reaction mixture in hexane can be extracted with a large excess of aqueous acid, such as 8N sulfuric acid, followed by an aqueous solution of a titanium (IV) comlexing agent, such as 5% aqueous hydroxyacetic acid, followed by aqueous base, such as 2N aqueous sodium hydroxide.

As used herein, the term "aliphatic hydrocarbon group" refers to a straight or branched chain alkyl, alkenyl or alkynyl group, optionally substituted by one or more alkoxy groups, containing from 6 to 30 carbon atoms and having a chainlength of at least 6 carbon atoms. The alkenyl group contains from one to four sites of olefinic unsaturation. The alkynyl group contains from one to three sites of acetylenic unsaturation.

The term "alkoxy" refers to the group alkyl-O- wherein the alkyl group contains from 1 to 10 carbon atoms.

The term "lower alkyl" refers to a straight or branched chain saturated aliphatic hydrocarbon group containing from 1 to 6 carbon atoms, e.g. methyl, ethyl, propyl, iso-propyl, butyl, and the like.

Typical fatty acids contemplated for use in the process of this invention include the following: lauric acid, palmitic acid, stearic acid, oleic acid, linoleic acid, linolenic acid, eleostearic acid, parinaric acid, tariric acid, erythrogenic acid, 3,7,11-trimethyldodeca-2,4-dienoic acid, 11-methoxy-3,7,11-trimethyldodeca-2,4-dienoic acid, 3,7,11-trimethyldodeca-2,4,10-trienoic acid and the like.

If desired, the ammonium salt of the fatty acid can be used with equally good results in the process of this invention.

The following examples illustrate the process of this invention. Temperature is given in degrees Centigrade.

EXAMPLE 1

To 143 g. (0.5 mole) of ammonium (2E,4E)-11-methoxy-3,7,11-trimethyl-2,4-dodecadienoate under nitrogen is added 148 ml. (0.5 mole) of tetraisopropyl titanate. The mixture is heated to 150°. As the temperature rises, the ammonium (2E,4E)-11-methoxy-3,7,11-trimethyl-2,4-dodecadienoate dissolves with evolution of ammonia. Isopropyl alcohol distills from the solution. The reaction mixture is allowed to stand at 150°–155° for 1.5 hours. The temperature is then lowered to 100° and residual tetraisopropyl titanate (33.4 g.) is recovered by distillation at 0.3 mm. The residual liquid is cooled to 25° and diluted with 500 ml. hexane. 20 Grams of calcium oxide is added, followed by 30 ml. of water. The resultant slurry is stirred for 3 hours and then the product is separated by filtration to give 144.4 g. of isopropyl (2E,4E)-11-methoxy-3,7,11-trimethyl-2,4-dodecadienoate as a pale yellow oil in 93% yield. The following Table sets out the yields of isopropyl 11-methoxy-3,7,11-trimethyl-2,4-dodecadienoate when the temperature, time, and molar ratio of ammonium salt to titanate are varied.

TABLE

| Ex. No. | moles titanate/ moles ammonium salt | Temperature | Time,hrs. | Yield,% |
|---|---|---|---|---|
| 2. | 1.3:1.0 | 145–155 | 1 | 98 |
| 3. | 1.1:1.0 | 145–155 | 1 | 96 |
| 4. | 1.0:1.0 | 150–155 | 1.5 | 93 |
| 5. | 1.0:1.0 | 175–185 | 0.75 | 98 |
| 6. | 0.8:1.0 | 145–160 | 1.5 | 78 |

The above Examples demonstrate yields of over 90% that are obtained from the process of this invention. When the molar equivalents of titanate to ammonium salt is allowed to drop below 0.9:1.0, a significant decrease in percent yield (to 78% at 0.8:1.0 in Example 6) occurs.

EXAMPLE 7

A mixture of (2E,4E)-11-methoxy-3,7,11-trimethyl-2,4-dodecadienoic acid (34.95 g.) and tetraisopropyl titanate (39 ml.) is heated under an atomsphere of nitrogen to 90°. Volatile material is removed by distillation at a pressure of 100 mm and a pot temperature of 90° to 130°. The distillate, which consists mostly of isopropyl alcohol, amounts to 9 ml. The residue is then heated under an atmosphere of nitrogen to 150° and is held at 145° to 155° for 1.5 hours. The mixture is cooled to about 100° and residual tetraisopropyl titanate is recovered by distillation at 3 mm and a pot temperature of 100° to 150°. This operation, which requires about 15 minutes, gives 9.5 ml. of recovered tetraisopropyl titanate. The residual liquid is cooled to room temperature, diluted with hexane, and extracted for 10 minutes with 49 ml. of 8N sulfuric acid. The hexane phase is separated and washed successively with 5% aqueous hydroxyacetic acid, 2N aqueous sodium hydroxide, and water. Each aqueous phase is back-extracted with hexane. The hexane solutions are combined and solvent is removed under vacuum to give isopropyl (2E,4E)-11-methoxy-3,7,11-trimethyl-2,4-dodecadienoate in 97% yield as a pale amber liquid.

EXAMPLE 8

A mixture of (2E,4E)-3,7,11-trimethyl-2,4-dodecadienoic acid (5.95 g., 0.025 mole) and tetramethyl titanate (6.45 g., 0.0375 mole) is heated to 70° with stirring under an atmosphere of nitrogen. After most of the solid has dissolved, the vessel is evacuated to 100 mm pressure and methanol is removed by distillation. The mixture is heated to 140° with stirring under vacuum, then nitrogen is introduced and the temperature is raised to 165°. After 3 hours at 160° to 165°, the reaction mixture is cooled to about 25° and diluted with 15 ml. of hexane. The resulting solution is stirred vigorously with 18 ml. of 8N sulfuric acid for 30 minutes. The organic phase is separated, filtered, and washed successively with 5% aqueous hydroxyacetic acid, 1N aqueous sodium hydroxide, and water. Solvent is removed by evaporation under vacuum to give 5.74 g. of methyl (2E,4E)-3,7,11-trimethyl- 2,4-dodecadienoate as a pale yellow liquid. Yield: 90%.

EXAMPLE 9

A mixture of ammonium (2E,4E)-3,7,11-trimethyl-2,4-dodecadienoate (20.4 g., 0.080 mole) and tetraethyltitanate (25 ml., 0.12 mole) is heated under an atmosphere of nitrogen to 80°. The system is evacuated to a pressure of 100 mm, causing ethanol and ammonia to evaporate from the reaction mixture. The temperature is raised to 130° and nitrogen is admitted to the vessel. The reaction mixture is held at 150° to 155° for 2 hours, then is cooled to about 25°, diluted with 50 ml. of hexane and extracted with 60 ml. of 8N sulfuric acid by vigorous stirring over a period of 30 minutes. The organic phase is separated and washed successively with 5% aqueous hydroxyacetic acid, 1N aqueous sodium hydroxide, and water. Solvent is removed by evaporation under vacuum to give 19.73 g. of ethyl (2E,4E)-3,7,11-trimethyl-2,4-dodecadienoate as an amber liquid. Yield: 93%.

I claim as my invention:

1. A process for the preparation of fatty acid esters of the formula

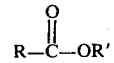

wherein R is an aliphatic hydrocarbon group having a carbon atom chainlength of at least 6 carbon atoms which is optionally substituted with one or more alkoxy groups and R' is lower alkyl which comprises, reacting a fatty acid of the formula

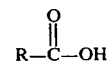

or an ammonium salt thereof with a titanate of the formula $(R'O)_4Ti$, the molar ratio of fatty acid to titanate being at least 1.0:0.9, at a temperature of 110° to 200°C.

2. The process according to claim 1 wherein the molar ratio of fatty acid to titanate is from 1.0:0.9 to 1.0:4.0.

3. The process according to claim 2 wherein the temperature is from 130°–185°C.

4. The process according to claim 3 wherein the molar ratio of fatty acid to titanate is from 1.0:0.9 to 1.0:2.0.

5. The process according to claim 4 wherein R' is ethyl, propyl, isopropyl, or butyl.

6. The process according to claim 5 wherein said acid is 3,7,11-trimethyldodeca-2,4-dienoic acid or 11-methoxy-3,7,11-trimethyldodeca-2,4-dienoic acid.

7. The process according to claim 6 wherein the molar ratio of acid to titanate is from 1.0:0.9 to 1.0:1.5.

8. The process according to claim 7 wherein R' is ethyl or isopropyl.

9. The process according to claim 8 wherein said acid is (2E,4E)-11-methoxy-3,7,11-trimethyl-2,4-dodecadienoic acid.

10. The process according to claim 9 wherein there is reacted the ammonium salt of (2E,4E)-11-methoxy-3,7,11-trimethyl-2,4-dodecadienoic acid with said titanate wherein R' is isopropyl to yield isopropyl (2E,4E)-11-methoxy-3,7,11-trimethyl-2,4-dodecadienoate.

* * * * *